July 25, 1961 M. M. VACLAW 2,993,948
CELL CONTAINER STRUCTURE
Filed Oct. 1, 1958

INVENTOR.
M.M. VACLAW
BY Hudson & Young
ATTORNEYS

United States Patent Office 2,993,948
Patented July 25, 1961

2,993,948
CELL CONTAINER STRUCTURE
Mike M. Vaclaw, Bartlesville, Okla., assignor to Phillips Petroleum Company, a corporation of Delaware
Filed Oct. 1, 1958, Ser. No. 764,726
1 Claim. (Cl. 136—166)

This invention relates to cell container structures. In one aspect, this invention relates to cell container structures constructed of olefin polymers for holding mercury battery cells, grid bias cells, and the like similar electrical components.

Mercury batteries are finding increased use in hearing aids, portable radio receivers, test equipment, Geiger counters and transistor circuits as a source of voltage. These batteries are usually constructed in the form of relatively thin discs. Usually the cell comprises an anode of amalgamated zinc powder containing lead and cadmium, a cathode-depolarizer of red mercuric oxide and graphite, and an electrolyte of a solution of an alkali metal hydroxide. Although mercury batteries have fairly long life and are relatively dependable in operation, such batteries are adversely affected by high humidity and elevated temperatures. In fact, mercury batteries are easily damaged by contact with a hot soldering iron in attaching electrical wiring thereto. The shape of these batteries makes rapid mounting, as well as the attachment of electrical wiring, difficult.

An object of this invention is to provide cell container structures for electrical cells wherein said electrical cells can be installed and removed without the application of solder thereto.

Another object of this invention is to provide cell container structures for mounting electrical cells in electrical circuits.

Another object of this invention is to provide cell container structures providing protection for electrical cells from heat, moisture, and corrosive atmospheres.

Another object of this invention is to provide cell container structures for mounting electrical cells without adversely affecting the life of said cells.

Other objects and advantages of this invention will be apparent to one skilled in the art upon studying this disclosure and the attached drawings.

Broadly, this invention provides cell container structures of highly crystalline polymers of aliphatic 1-olefins comprising a cup for holding a mercury battery cell or a similar device, a detachable cap adapted to engage said cup in pressure sealing relation to prevent contact of said cell by the atmosphere and having a resilient top for holding said seal firmly in place within said cup, and electrical contacts within said cap and said cup connected to outside electrical terminals for attachment in an electrical circuit. As set forth in this invention, the top of the cap is constructed so as to be sufficiently thin as to be slightly deflectable in order to obtain a high compression force for holding the electrical cell against the electrical contacts. Preferably, the top surface of the cap is constructed to be recessed or depressed into the cap before assembling with the cup so that assembly of the cap with the cup containing the electrical cell forces the top surface of the cap outwardly into a substanially flat surface to thereby apply substantial pressure between the electrical contacts and the electrical cell. If desired, as disclosed in the invention, a spring means can be inserted between one electrical contact and the electrical cell to obtain increased pressure between the electrical contacts and the cell.

Figure 1:
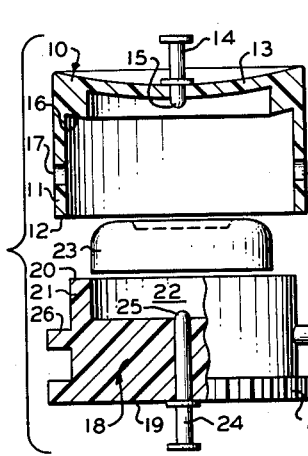
FIGURE 1 is an exploded longitudinal sectional view of one cell container structure of this invention.
Figure 2:
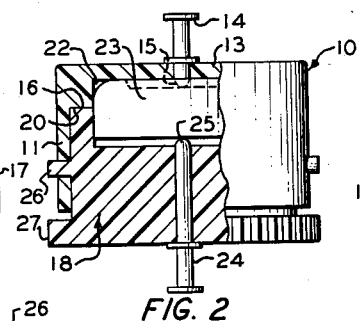
FIGURE 2 is a longitudinal sectional view of the cell container structure of FIGURE 1 in assembled form.
Figure 3:
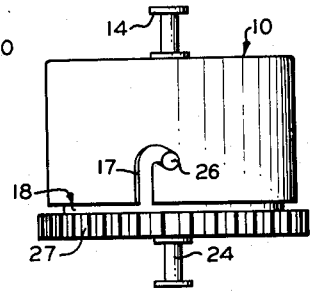
FIGURE 3 is a side view of the cell container structure shown in FIGURE 2.
Figure 4:
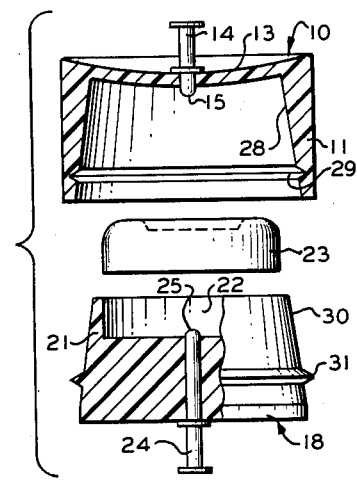
FIGURE 4 is an exploded longitudinal sectional view of a second cell container structure of this invention.
Figure 6:
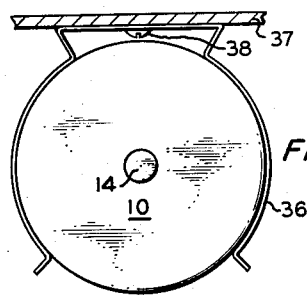
FIGURE 6 is a top view of the cell container structure of FIGURE 5 showing the mounting thereof in an electrical circuit.
Figure 5:
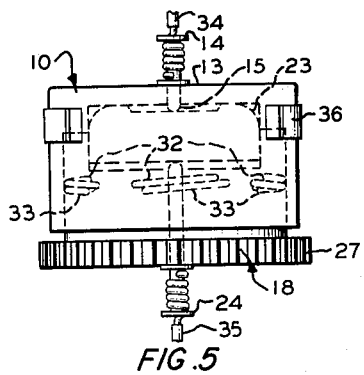
FIGURE 5 is a side view of a third cell container structure of this invention.
Figure 7:
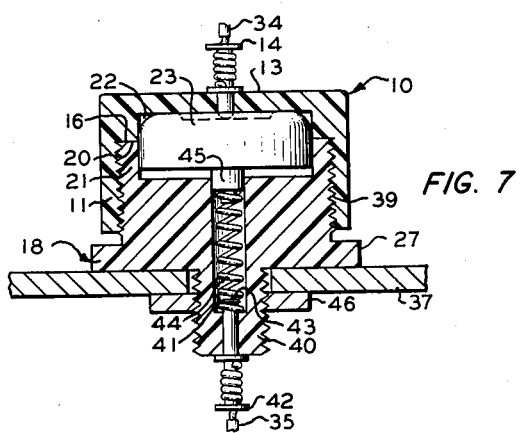
FIGURE 7 is a longitudinal sectional view of a fourth cell container structure of this invention showing the mounting of this structure in an electrical circuit.

The cup and the cap of the cell container structure of this invention can be detachably connected together in pressure sealing relation with various means as will be known to those skilled in the art. The cup can be engaged with the cap in both telescopic and rotatable movements whereby a sealing member in the cap is engaged with a sealing member in the cup to exclude the atmosphere from within the enclosed cup. For example, the cup and the cap can be joined by bayonet connecting means as shown in FIGURES 1, 2 and 3 of the drawings; by friction connecting means as shown in FIGURE 4 of the drawings; by interrupted thread connecting means as shown in FIGURES 5 and 6 of the drawings; and by screw thread connecting means as shown in FIGURE 7 of the drawings. Preferably, the cap and the cup are engaged in pressure sealing relation by only slight rotation, where rotational movement is used to connect the two, in order to avoid unnecessary twisting of the electrical wiring connected to the terminals on the cup and the cap. However, the cup and the cap can be rotated several revolutions in some installations and also where the electrical wiring is attached to the cell container structure first before being attached at its free ends in the electrical circuit.

Referring to Figures 1, 2 and 3 of the drawings, cylindrical cap 10 is constructed with a cylindrical wall 11 open at one end 12 and closed at the other end by a top 13 which is recessed into the cap in disassembled form. Perpendicularly projecting electrical terminal 14 is mounted on the axis of cap 10 through top 13 with one end extending within cap 10 to form electrical contact 15. Sealing surface 16 is provided within cap 10 adjacent the inner surface of top 13. Bayonet slots or J-slots 17 are provided opposite from each other in cylindrical wall 11.

Cup 18 is provided with a base 19 and an open end 20 having a cylindrical wall 21 of a diameter slightly smaller than the diameter of cylindrical wall 11 of cap 10. Cylindrical wall 21 and base 19 of cup 18 form chamber 22 for receiving mercury battery cell 23. Perpendicularly projecting electrical terminal 24 is mounted along the axis of cup 18 with one end projecting into chamber 22 to form electrical contact 25. Opposed projecting pins 26 are located on the outer surface of cylindrical wall 21 for engaging bayonet slot 17 in cup 10 and thereby connect cup 10 to base 18 in a pressure sealing relation between ceiling member 16 of cup 10 and open end 20 of cylindrical wall 21 of base 18. Shoulder 27 is provided on the end of cup 18 with a knurled outer surface for ease in gripping cup 18 when cap 10 is attached thereto. As shown in FIGURE 2, the locking of cap 10 in place with cup 18 containing battery cell 23 forces top 13 of cap 10 outwardly until the surface is flat and thereby holds battery cell 23 firmly in place between electrical contacts 15 and 25.

In FIGURE 4 of the drawings, wherein similar elements of the cell container structure of FIGURES 1, 2 and 3 are identified by similar reference numbers, the attachment of cap 10 to cup 18 in pressure sealing relation is secured by a friction type connection. The inner surface 28 of cylindrical wall 11 of cap 10 is tapered outwardly from top 13 to provide a sealing surface. Circumferential groove 29 is provided in surface 28 adjacent the open end of cap 10. The outer surface of cylindrical wall 21 of cup 18 is provided with tapered surface 30 which is designed to fit tapered surface 28 of cap 10 in pressure sealing relation. Circumferential ridge 31 is provided on tapered surface 30 and located so as to form a pressure sealing relation between tapered surfaces 28 and 30 when ridge 31 is placed within groove 29. When cap 10 is attached to cup 18 with ridge 31 located in groove 29 recessed top 13 of cap 10 is forced outwardly so that the surface is substantially flat and the battery cell is held in firm electrical contact with terminals 14 and 24.

In FIGURE 5 of the drawings, cap 10 is attached to cup 18 in pressure sealing relation by means of a plurality of spirally arranged ribs 32 and 33 located on the outer surface of cylindrical wall 21 of cup 18 and the inner surface of cylindrical wall 11 of cap 10, respectively. Ribs 32 and 33 are constructed of short length and number four in number so that the seal between shoulder 16 and sealing surface 20 can be effected within a one-quarter turn of cap 10 with respect to cup 18. The attachment of electrical wire 34 to terminal 14 and electrical wire 35 to terminal 24 is also shown in FIGURE 5. The cell container structure is mounted in the electrical apparatus by clip 36 attached to chassis 37 by screw 38, as shown in FIGURE 6 of the drawings.

In FIGURE 7 of the drawings, cap 10 is attached to cup 18 in pressure sealing relation by screw threads 39. Cup 18 is provided with a stem 40 which forms the lower portion of cup 18. Elongated cylindrical chamber 41 located along the axis of cup 18 within base 19 and extending within stem 40 is in open communication with cell member 22 of cup 18. Terminal 42 extends perpendicularly from the bottom end of stem 20 with one end 43 extending into chamber 41. Compression spring 44, constructed of a material which conducts electricity, is in electrical contact with end 43 of terminal 42. Electrical contact 45 is fixed to the other end of spring 44 and provides electrical contact with battery cell 23. If desired, a loose electrical wire can be attached to electrical contact 45 and end 43 of terminal 42 so that spring 44 need not be an electrical conductor. The cell container structure is mounted on chassis 37 by insertion of stem 40 in a hole drilled therein and held firmly in place by nut 46.

The cap and the cup of the cell container structure of this invention are constructed of a polymer of an olefin, preferably a highly crystalline polymer of an aliphatic 1-olefin such as a polymer of ethylene, because these polymers have certain electrical, physical and chemical properties which permit the construction of an improved cell container structure. In the cell container structure of this invention, the cap which holds the battery cell in firm electrical contact with the electrical terminals must be relatively stiff in order that a pressure sealing connection can be made, but not too brittle so as to be readily broken, and resilient, particularly in the top surface of the cap, so as to hold the battery cell firmly in place. Other plastics, such as the styrene and the formaldehyde resins, have not been found suitable for the construction of the cell container structure of this invention. Although hard rubber has some suitable properties, this material is not suitable for constructing this cell container because the dielectric properties of the hard rubber are too low. The polyolefin material used to construct the cell container structures of this invention should have an impact strength of at least 3 foot/pounds per inch, notched, as determined by ASTM D256, a volume resistivity greater than $3 \times 10^{15}$ ohm-centimeter, as determined by ASTM D257, a stiffness of at least 20,000 p.s.i. and preferably 140,000 p.s.i., and a water absorption less than 0.2 percent in 24 hours, 1/8 inch thickness, as determined by ASTM D570.

The polymers of ethylene which can be used to construct the cell containers of this invention are a high density and highly crystalline material. These polymers often have an inherent viscosity of at least 0.8, preferably an inherent viscosity between 1.2 and about 10, as determined from a solution of 0.2 gram of polymer in 50 cc. of tetraline at 130° C. The polymers also have a crystallinity of at least 70 percent, preferably at least 80 percent, and more desirably at least 90 percent, at 25° C. The crystallinity of the polymers can be determined by measurements of nuclear magnetic resonance (Wilson and Pake, Journal of Polymer Science, 10, 503 (1953)), using a sample of polymer which is in a state approaching equilibrium at 25° C. An approach to this equilibrium state can be achieved by heating the polymer sample to a temperature of about 50° C. above its crystalline melting point, maintaining the sample at this temperature for about 1 hour, and then cooling to 25° C. at a rate characterized by fall of about 1.5° C. per minute at 135° C. The softening point of the polymer will vary with the particular polymer used, increasing as the density and crystallinity of the polymer increases. Generally, the softening point of the high density solid polymer is in the approximate range of 240° F. to 270° F.

Polymers having the above described properties are preferably produced by the method set forth in U.S. 2,825,721 (1958) of J. P. Hogan and R. L. Banks filed March 26, 1956. As described in detail in the Hogan and Banks patent, the polymers to be treated in accordance with the present invention can be produced by contacting an aliphatic 1-olefin, such as ethylene or propylene or mixtures of ethylene and other unsaturated hydrocarbons, e.g., mixtures of ethylene with minor amounts of monoolefins containing up to and including 6 carbon atoms per molecule, such as propylene, 1-butene and 1-pentene, with a catalyst comprising as its essential ingredient from 0.1 to 10 or more weight percent chromium in the form of chromium oxide, preferably including a substantial amount of hexavalent chromium. The chromium oxide is ordinarily associated with at least one other oxide, particularly at least one oxide selected from the group consisting of silica, alumina, zirconia, and thoria. It is preferred that the plastic materials which are to be treated in accordance with this invention be formed with polymers of ethylene produced in accordance with the Hogan and Banks method. The term "polymers of ethylene" as used herein is intended to include polymers obtained by polymerizing ethylene and mixtures of ethylene and other unsaturated hydrocarbons.

Other polymers suitable for use in forming plastic materials to be used in accordance with this invention can be obtained by other methods, e.g., by proceeding according to the processes disclosed by J. A. Reid in copending U.S. Patent application Serial No. 494,281, filed March 14, 1955, now abandoned and by H. D. Lyons and Gene Nowlin in copending U.S. Patent application Serial No. 495,054, filed March 17, 1955. As disclosed in the first of these patent applications, a solid olefin polymer, such as a polymer of ethylene, can be produced by contacting ethylene with a catalyst comprising a mixture of an organo-metallic compound, such as an aluminum trialkyl, and a halide of group IV metal of the periodic table such as titanium tetrachloride. As disclosed in the latter of the aforementioned patent applications, an olefin, such as ethylene, is polymerized in the presence of a catalyst comprising an organo-metallic halide such as ethylaluminum dichloride, and a halide of a group IV metal, such as titanium tetrachloride, so as to provide a high molecular weight olefin polymer. While it is prefered because of superior properties to employ polymers prepared as described hereinabove in forming the plastic materials which are to be used in the construction of the cell container structure in accordance with this invention, the invention is also applicable to plastic materials formed from other types of olefin solid polymers, such as polyethylene having a low density and a low crystallinity.

EXAMPLE

The cell container structure shown in FIGURE 7 of the drawings was constructed of a polymer of ethylene which was prepared in the presence of a chromium oxide-containing catalyst following a procedure described in the aforementioned Hogan and Banks patent. The properties of the polymer of ethylene are set forth hereinbelow in Table I.

Table I

| | |
|---|---|
| Softening Temperature, °F. [1] | 260 |
| Density | 0.96 |
| Injection molded: | |
|    Tensile strength, p.s.i. [2] | 5,100 |
|    Elongation, percent [3] | 28 |
| Compression molded: | |
|    Tensile strength, p.s.i. | 4,200 |
|    Elongation, percent | 20 |
| Stiffness, p.s.i. [4] | 140,000 |
| Melt index [5] | 0.6 |
| Impact strength, Izod [6] (ft. lbs./in. notch) | 3.0 |
| Heat distortion, °F. [7] | 165 |
| Crystallinity, percent | above 92 |

[1] Adapted from method of Karrer, Davis and Dietrich, Ind. & Eng. Chem. (Anal. Ed.) 2, 96 (1930).
[2] ASTM D 638–52T.
[3] ASTM D 412–51T.
[4] ASTM D 747–50.
[5] ASTM D 1238–52T.
[6] ASTM D 256–54T.
[7] ASTM D 648–45T.

This cell container structure was placed in electronic apparatus and used therein. The mercury battery cell placed within the container structure did not fail during the subsequent use of the equipment.

Reasonable variation and modification are possible within the scope of the foregoing disclosure, drawings and the claims to the invention, the essence of which is that there has been provided a cell container structure of highly crystalline polymers of aliphatic 1-olefins as described hereinabove.

I claim:

A cell container structure comprising a circular cup made of a highly crystalline polymer of ethylene, said cup having a recess for receiving a cell, the upper portion of the outer cylindrical wall of said cup being threaded, said cup having a first axial passage extending from said recess through the base of said cup, a first electrical terminal disposed in said first passage, said first terminal comprising an electrical contact member and an electrically conducting compression spring urging said electrical contact member into said recess into contact with said cell therein, a circular cap made of said polymer and surmounting said cup, said cap having a recess which together with said recess of said cup form a chamber for said cell, the lower portion of the inner cylindrical wall of said cap being threaded and adapted to come into sealing engagement the said threads of said cup, said cap having a second axial passage, and a second electrical terminal disposed within said second passage and adapted to come into contact with said cell within said chamber, said polymer having a crystallinity of at least 70 percent at 25° C., a volume resistivity greater than $3 \times 10^{15}$ ohm-centimeter, and a stiffness of at least 20,000 p.s.i.

References Cited in the file of this patent

UNITED STATES PATENTS

| | | |
|---|---|---|
| 2,366,929 | Pfeil | Jan. 9, 1945 |
| 2,451,726 | Fry | Oct. 19, 1948 |
| 2,625,575 | Ellis | Jan. 13, 1953 |
| 2,816,682 | Brucker | Dec. 17, 1957 |
| 2,876,273 | Hall | Mar. 3, 1959 |